United States Patent [19]

Palmer et al.

[11] 4,456,121

[45] Jun. 26, 1984

[54] LOAD MOVING APPARATUS

[75] Inventors: Guy V. Palmer, Brighton; Raymond J. Schihl, Dryden, both of Mich.

[73] Assignee: Automatic Hydraulic Devices, Flint, Mich.

[21] Appl. No.: 257,143

[22] Filed: Apr. 24, 1981

[51] Int. Cl.³ .................. B61B 13/12; B65G 25/04; B65G 41/00

[52] U.S. Cl. .................................. 198/750; 104/94; 104/111; 104/162; 105/155; 198/486; 198/690

[58] Field of Search .............. 104/89, 107, 109, 111, 104/162, 254, 94; 105/155; 198/485, 486, 679, 690, 745, 750

[56] References Cited

U.S. PATENT DOCUMENTS

| | | | |
|---|---|---|---|
| 293,451 | 2/1884 | Grosscup | 104/107 |
| 885,925 | 4/1908 | Hooper | 198/750 |
| 1,752,731 | 4/1930 | Caruso | 104/254 |
| 2,229,002 | 1/1941 | Comey | 104/111 |
| 3,882,792 | 5/1975 | McIntier | 104/162 |
| 3,922,970 | 12/1975 | Glastra | 105/155 X |
| 4,172,686 | 10/1976 | Shorthouse | 198/485 X |

Primary Examiner—Robert B. Reeves
Assistant Examiner—Howard Beltran
Attorney, Agent, or Firm—Fisher, Gerhardt, Crampton & Groh

[57] ABSTRACT

A load moving apparatus for moving loads such as tools, fixtures or parts in a linear path comprising an elongated channel-shaped frame member having a pair of rod-like guide members which support a carriage member for the movement in a reciprocating path longitudinally of the frame for all possible positions of the frame.

13 Claims, 10 Drawing Figures

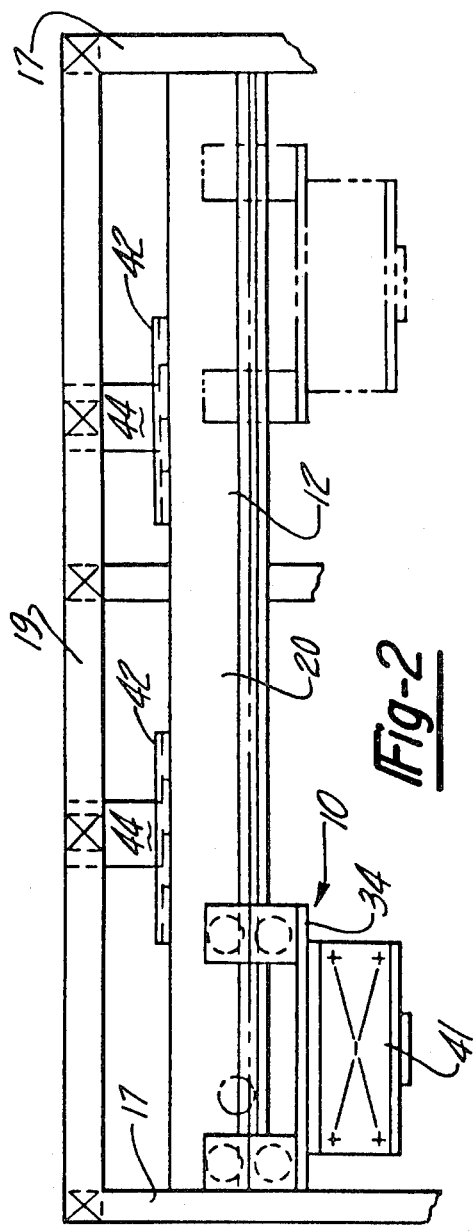
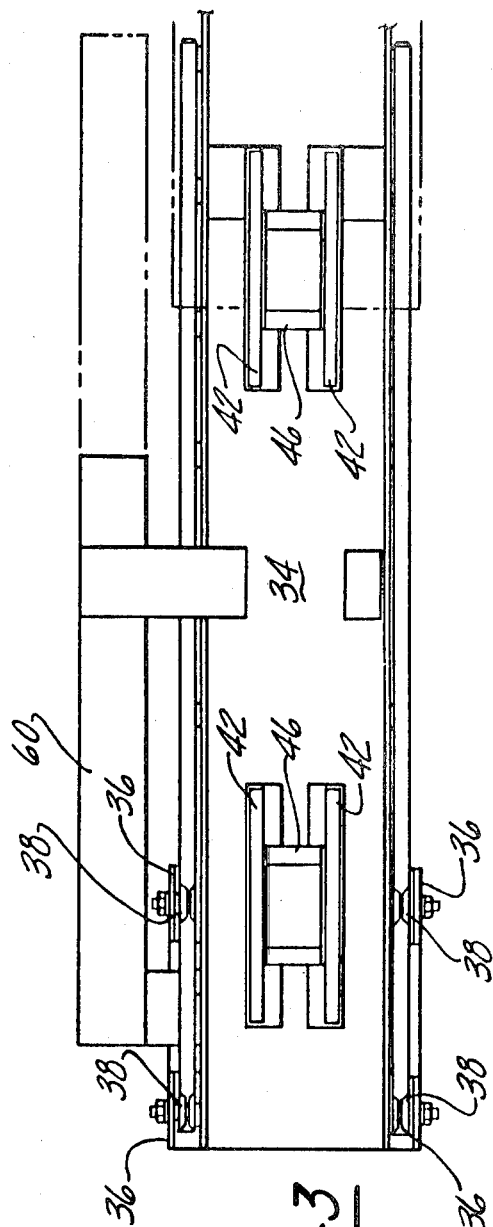
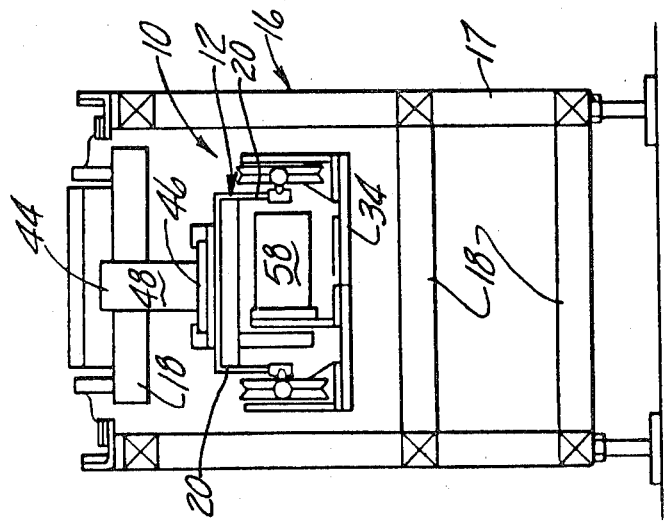

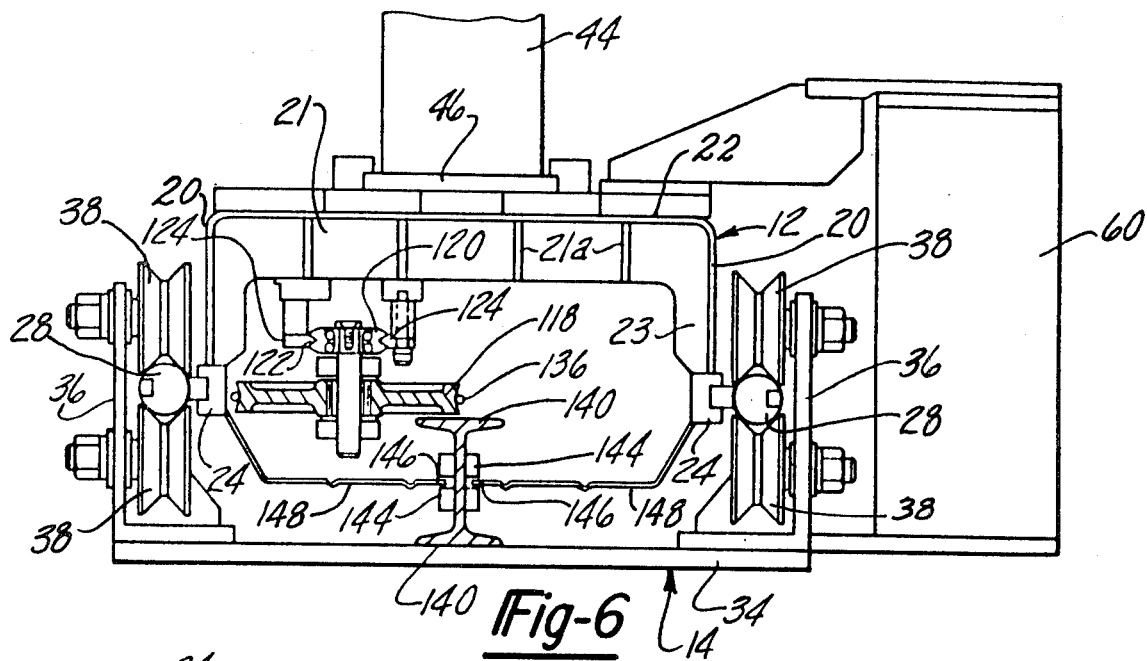
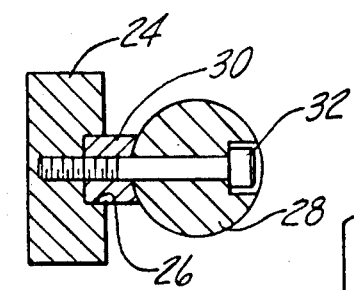
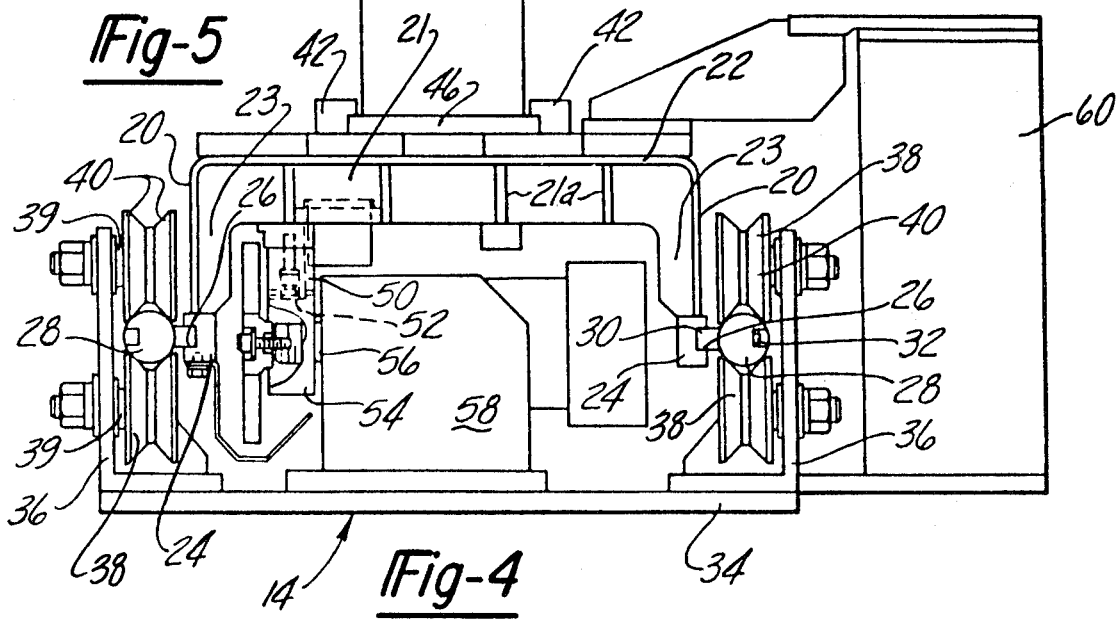

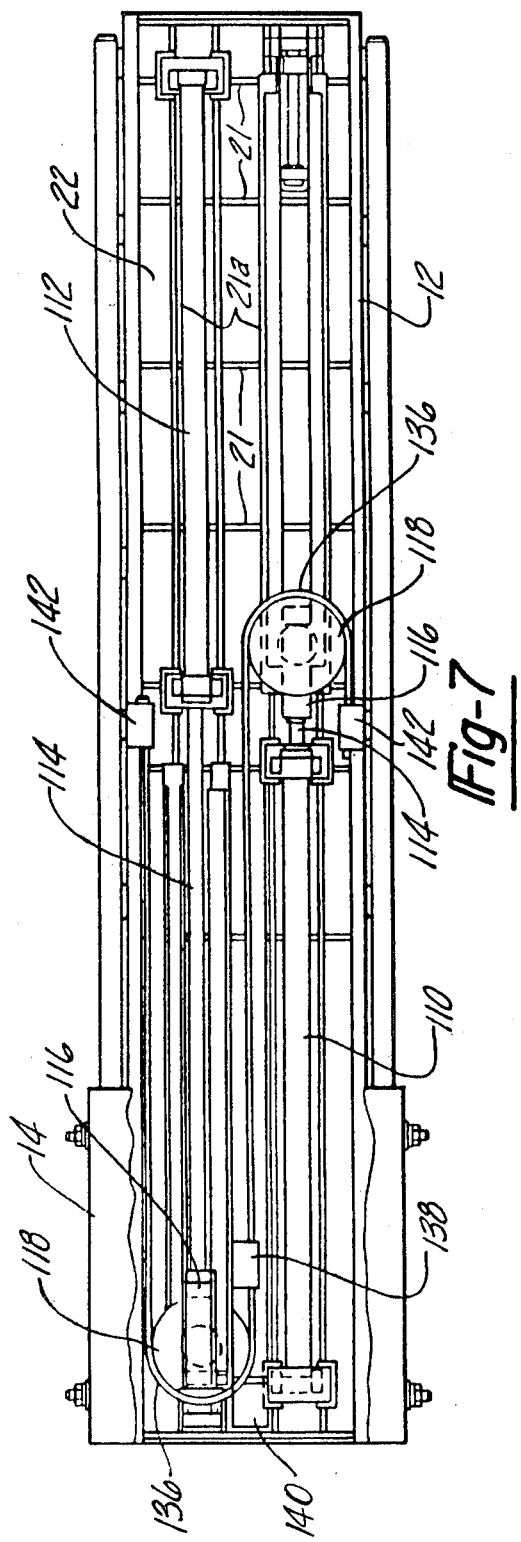
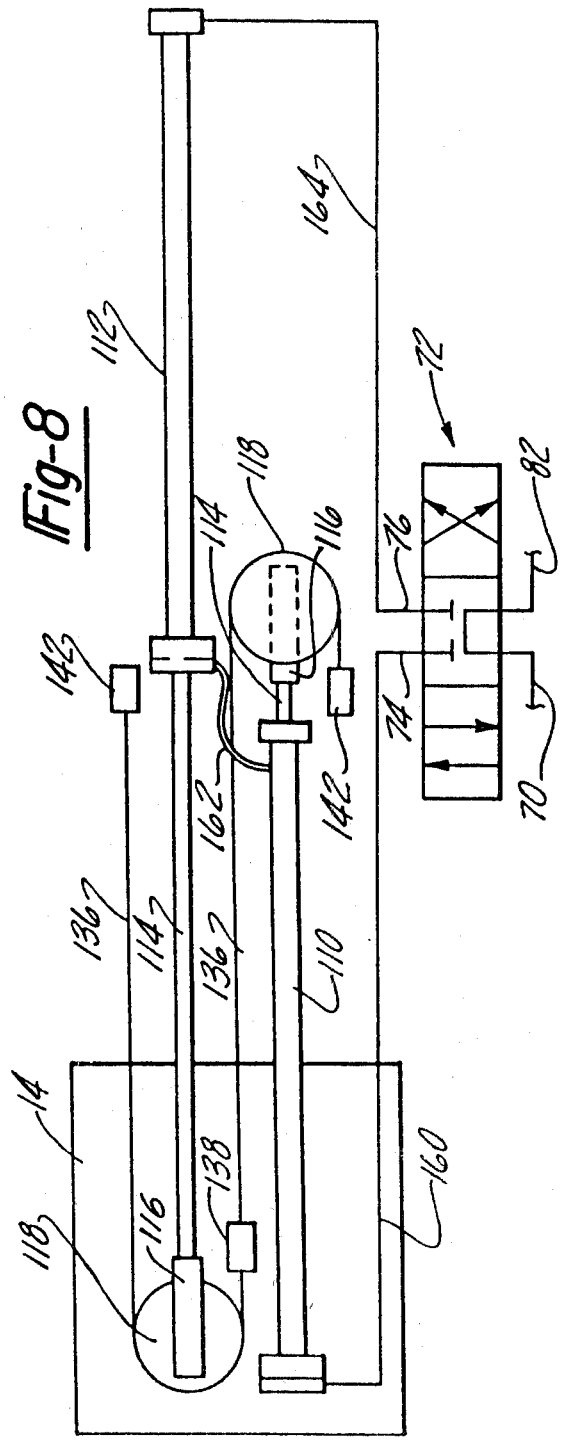

LOAD MOVING APPARATUS

This invention relates to load moving or transferring apparatus and particularly to such apparatus used in mass production and assembly line operations.

A variety of shuttle or transfer devices have been provided which typically are limited to small loads or to operation in a specific attitude such as in the horizontal position or vertical position. A need has been demonstrated for devices which can move heavy loads accurately and repetitivly at high speeds and which can be added to existing machines and assembly lines.

It is an object of the invention to provide load moving apparatus in which heavy loads can be reciprocated in a predetermined path orientated in any plane.

Another object of the invention is to provide a load moving apparatus in which various components may be easily removed and replaced in the field without requiring removal of the entire apparatus or re-machining.

Another object of the invention is to provide a load moving apparatus in which a reciprocating carriage member can be powered by a variety of power sources and in which one power source may be changed to another with a minimum of effort.

The objects of the invention are accomplished by providing a load moving apparatus wherein a channel-shaped frame member is provided with guide means which insures that a carriage member can be moved in a reciprocating path longitudinally of the frame in any position of the frame. The carriage member employs rolling elements which engage rod like guide members at diametrically opposed points. In one embodiment of the invention the carriage member is moved through means of a rack and pinion arrangement driven by the source of hydraulic pressure and in another embodiment by reciprocating hydraulic actuators. In both embodiments, it is prefered that the source of hydraulic pressure is a closed circuit hydrostatic source, although open circuits and other fluid mediums may be used.

These and other objects of the invention are accomplished by the embodiments disclosed in the following description and illustrated in the drawings in which:

FIG. 1 is an end view of the load moving apparatus embodying the invention shown supported in working position by a frame structure;

FIG. 2 is a side view of a portion of the structure shown in FIG. 1 with a tool attached to the load moving apparatus;

FIG. 3 is a top plan view at a slightly enlarged scale of the load moving apparatus separate from its supporting structure;

FIG. 4 is an end view at an enlarged scale of the load moving apparatus seen in FIG. 1;

FIG. 5 is a view at an enlarged scale of a portion of the structure seen in FIG. 4;

FIG. 6 is a view similar to FIG. 4 showing another embodiment of the invention;

FIG. 7 is a bottom view of the embodiment seen in FIG. 6 at a reduced scale;

FIG. 8 is a diagrammatic view and a portion of the hydraulic circuit of the embodiment seen in FIG. 7;

Figure 9:
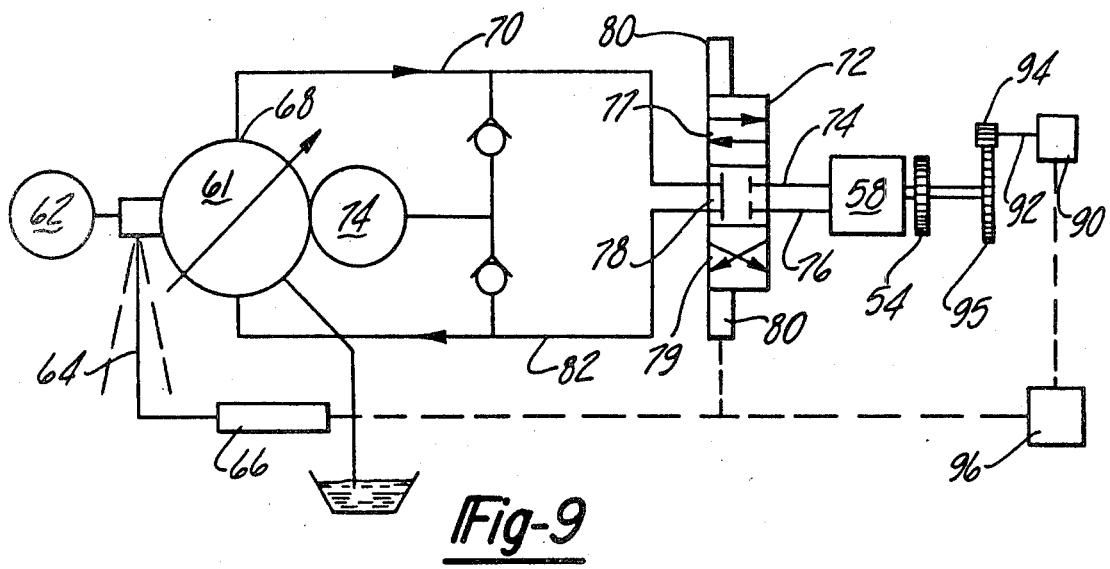
FIG. 9 is a diagrammatic view of a hydrostatic circuit used with the embodiment seen in FIGS. 1 through 5.

The load moving or shuttle apparatus embodying the invention is designated generally at 10 and includes a generally channel-shaped elongated frame member 12 which supports a carriage 14 for reciprocating movement longitudinally of the frame. The frame 12 is adapted to be supported in any selected position ranging from a vertical and a horizontal and in any position of rotation about an axis extending longitudinally of the frame 12. Typically such load moving apparatus is mounted directly on a machine frame or on a support structure 16 made up of rectangular or cylindrical vertical members 17 connected together by horizontal end members 18 and longitudinally extending horizontal members 19. Typically such a support structure 16 is located in association with an assembly line for machines of various types which conduct operations such as drilling, broaching, pressing and the like so that tools, clamps or other fixtures can be moved toward and away from the line.

The load moving apparatus 10 incorporates a relatively elongated frame 12 which may vary in length depending on the distance that tools or parts are to be transported. Typically, lengths would vary from six feet to twelve feet or more.

The frame 12 has a pair of opposed parallel flanged portions 20 joined together by a fabricated web 22. The flanges 20 have spaced reinforcing ribs 23 on their inboard side. Also the web 22 is provided with transversely extending reinforcing ribs 21 and longitudinally extending reinforcing ribs 21a as best seen in FIG. 7. In this manner the fabricated frame 12 is a very rigid load supporting frame.

The free ends of the flanges 20 are provided with a pair of parallel extending bars 24 having outer facing grooves which extend the full length of the frame 12. The grooves 26 are very carefully machined to maintain accurately spaced parallel and oppositely facing surfaces. A pair of guide rods 28 having a circular cross-section extending for the full length of the frame and are mounted on the bars 24 through the medium of key elements 30 which are disposed in the grooves 26 in longitudinally spaced relationship to each other. Screws 32 pass through and are counter-sunk in the rods 28 and also pass through the spacers 30 and are threadably engaged with the bar 24 as seen in FIG. 5. By accurately machining the key elements or spacers 30, it is possible to locate the guide members 28 so they are in very accurate parallel relationship to each other. Moreover it is possible to replace guide rods 28 without removal of the entire load moving apparatus 10 and without any additional machining operations simply by substituting new rod members 28.

The carriage 14 which is supported from the frame 12 for movement longitudinally thereof has a base or machine plate 34, the four corners of which are provided with bracket elements 36 as seen in FIG. 3. As seen in FIG. 5, each bracket supports a pair of flanged wheels 38 on stub axles 39 so that the wheels are disposed at diametrically opposed sides of the guide rods 28. Each of the wheels 38 has a pair of generally frusto-conical flanges 40 which face each other and engage circumferentially spaced portions on the outer surface of guide rods 28. Each wheel 38 has substantial line contact along a pair of parallel lines extending longitudinally along the outer surface of the rods 28. This gives the carriage member 14 stability transversly of the frame member 12 for all positions of rotation of the frame member about its longitudinal axis making it possible to mount a frame member 12 in any desired position and still retain the carriage 14 for accurate guided movement. Also the guide rods 28 are preferable made of non-magnetic stainless steel to resist adherance of dirt particles, machine chips, weld splatter and the like.

The base or machine plate 34 can take a variety of forms and is for the purpose of supporting various members such as fixtures, tools, or clamps for working on parts or for transporting parts from one position to another. One such member is illustrated diagramatically at 41 in FIG. 2. For this purpose it is necessary that the carriage is moved very accurately with heavy loads and at relatively high speeds.

For the purpose of supporting the load moving apparatus 10 from the base or support structure 16, the frame 12 is provided with pairs of parallel extending gib members 42 located near the opposite ends of the frame 12. Such gib members are adapted to receive and secure a variety of bracket members, one type of which is indicated at 44 in FIGS. 1-3 and which includes a flange portion 46 adapted to be received and held by the gib members 42 and a body portion 48 which can be fastened through a variety of different arrangements to the vertical or horizontal frame members 17, 18, and 19 of the support structure 16.

In a first embodiment of the invention, as illustrated in FIG. 4, the carriage 14 is moved relative to the frame 12 by rack and pinion means in the form of a rack 50 which is supported within the channel shaped frame member 12 to extend substantially the full length of the frame 12 and parallel to the flanges 20. As indicated, the rack 50 can be mounted in position by means of machine screws 52 passing through the rack 50 and into the web 22. A pinion gear 54 is in engagement with the rack 50 and is mounted on a shaft 56 of a rotary motor 58. Preferably the motor 58 is of the hydraulic type and is supported from an inboard surface of the plate 34. In this manner, the motor 48 and its rotating parts are shrouded and contained within the space within the channel-shaped frame 12 and the base plate 34.

The hydraulic motor 58 can be driven from a source located adjacent the support structure 16 by means of flexible hydraulic lines carried in a well known manner by a rolling conductor carrier arrangement designated generally at 60 in FIGS. 3 and 4, one form of which is available under the name CATRAC from Gemco Electric Company of Clawson, Michigan.

Preferably the hydraulic motor 58 forms a part of a closed circuit, hydrostatic drive arrangement shown diagrammatically in FIG. 9. The hydrostatic drive arrangement includes a pump 61 of the variable displacement and unidirectional type which preferably is driven at a uniform speed by an electric motor 62. The pump 30 includes a moveable control member 64 which is connected to the usual swash or wobble plate of the variable displacement pump 60. Movement of the control member 64 in opposite directions, for example, by a linear hydraulic actuator 66 changes the angle of the swash plate to increase or decrease the output of pump 60 at its output port 68. The output port 68 is connected to a supply line 70 connected through a control valve 72 with the hydraulic motor 58 driving the pinion 54. The motor 48 has a pair of ports 74 and 76 one of which acts as the intake and the other as the discharge port depending on the positioning of the four way control valve 72.

The four way control valve 72 is of conventional type and may be moved to any of its three positions indicated at 77, 78 and 79 by a pair of solenoids 80. In the position shown in FIG. 9 the valve 72 is effective to bypass hydraulic fluid delivered by the pump 60 to the supply line 70 back through a return line 82 and to the pump 60 to the supply line 70 back through a return line 82 and to the pump 60 so that the motor 58 is bypassed. Upon actuation of one of the solenoids 80 to move the valve 72 to the position 77 the motor is driven in one direction and upon actuation of the other solenoid to move the valve 78 to position 79, the motor 58 is driven in the opposite direction.

The use of the hydrostatic system is preferred since it makes it possible to accurately control various aspects of the movement of heavy parts such as the acceleration deceleration, maximum and minimum speeds as well as braking and stopping. Such control is significant for accurately moving heavy loads at high rates of speed with great precision and in repetitive cycles.

The control by which movement of the carriage 14 is controlled can take a variety of forms including conventional limit switches and the like but by way of example can include a pulse generator 90 which delivers an analog signal varying as a function of the angular rotation of its input shaft 92. As seen in FIG. 9 the input shaft 92 can be connected to a pinion 94 in mesh with a gear 95 rotating as a unit with the pinion 54 moving the carriage 14. By a proper selection of the gear ratio between the pinion 94 and gear 95 a transducer 90 can then be used through a micro-computer 96 to control the operation of the stroking actuator 66 and solenoids 80 of the control valve 72.

Figure 10:
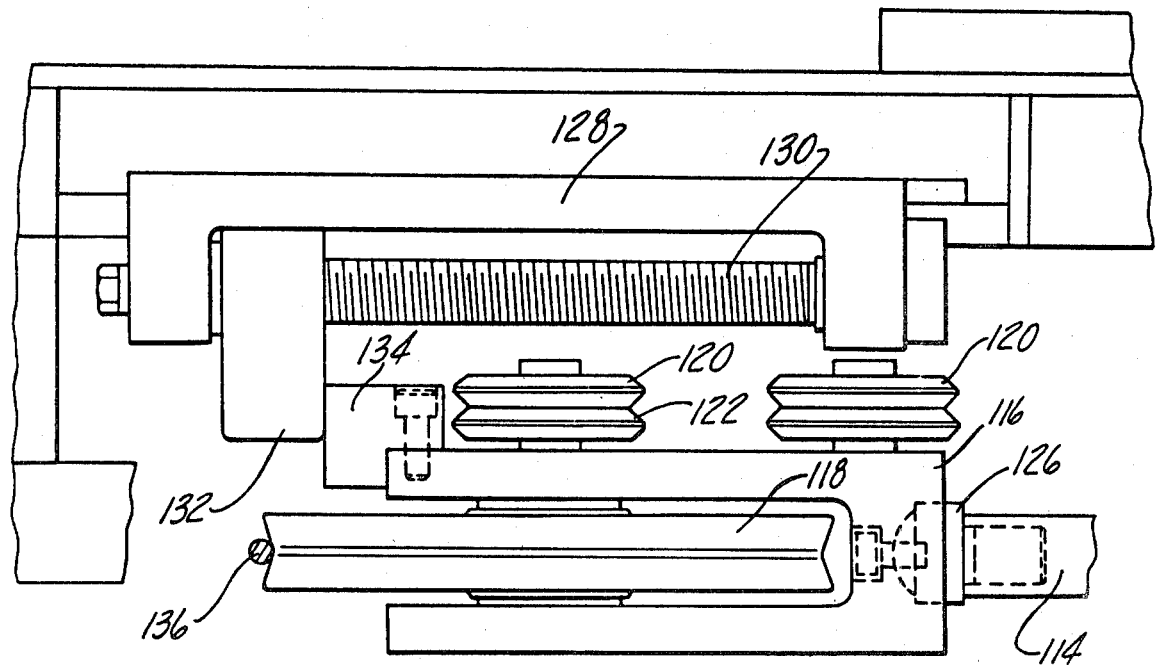
FIG. 10 is a view at an enlarged scale of a portion of the structure associated with the embodiment seen in FIGS. 6 and 7.

Referring to FIGS. 6 and 7 a second embodiment of the invention is illustrated which employs an identical frame 12, carriage 14 and associated parts as the first embodiment of the invention. However, the means for transmitting motion to the carriage 14 is different and takes the form of pulley and cable means powered by linear hydraulic actuators 110 and 112. The hydraulic actuators 110 and 112 are positioned to extend generally longitudinally of the frame 12 and are positioned with their movable rods 114 extending in opposite directions. As seen in FIG. 10, the ends of the rods 114 are provided with a clevis 116 supporting a pulley sheave 118. The end of the rods 114 together with the clevis 116 and pulley 118 are supported during movement by a guide wheel 120 supported for rotation coaxially with the pulley 118 at one side of the clevis 116. The guide wheels 120, one of which is associated with each of the rods 114 of the hydraulic actuator 110 and 112 is provided with an annular groove 122 which is engaged at diametrically opposed points by guide bars 124 seen in FIG. 6 for the full length of the path of travel of the rods 114 or for approximately one-half of the length of the frame 12. The guide bars 124 are supported from the web 22.

Each clevis 116 is attached to the ends of a rod 114 by means of a connector 126 FIG. 10 which affords limited universal movement about the axis of the rods 114 to accomodate any small amount of movement during reciprocation of the rods.

In their extended condition, the hydraulic actuators 110 and 112 extend for almost the full length of the frame 12. The fully extended position of each actuator 110,112 is determined by a separate stop mechanism which as seen in FIG. 10 includes a bracket 128 supported on the end of the frame 12, the bracket 128 supports an axially fixed but rotatable threaded member 130 on which is mounted an adjustable stop element 132. Rotation of the threaded member 130 serves to move the adjustable stop element 132 to selected positions along the full length of the threaded member 130. The stop element 132 engages a complementary stop element 134 fastened on one leg of the clevis 116 adjacent to the guide wheel 120. During extension of the hydraulic actuators 110 and 112, the stop elements 132 and 134 come into engagement with each other to prevent further movement. Identical stop arrangement can be used with the embodiment of FIGS. 1 through 5 for the same purpose.

Movement of the carriage 114 in opposite directions is brought about by alternate extension and retraction of the hydraulic actuators 110 and 112 which are connected to the carriage 14 by means of cables 136 associated with each of the actuators. One end of each of the cables 136 is fastened to a support station 138 (FIG. 7) and the top of an I-beam 140 extending longitudinally the full length of the carriage 14. The cables 136 extend in opposite directions from the carriage 14 and are trained around the pulleys 118 at the end of each of the rods 114 and extend to separate anchor brackets 142 disposed at opposite sides of the frame 12.

As seen in FIG. 6, sides of the I-beam 140 are fitted with a guide bearing 144 having oppositely facing slots which receive the edges 146 of cover plates 148 extending to opposite sides of the I-beam 140. The cover plates 148 extend for the full length of the frame 12 and have their outboard edges fastened to the bars 24. The cover plates 148 serve to shield the hydraulic actuators 110, 112 as well as the pulley and cable means.

As illustrated in FIG. 7, in the initial position of the carriage 14 relative to the frame 12 one of the actuators is fully retracted and the other of the actuators 112 is fully extended. The hydraulic circuit by which one actuator is extended while the other actuator is retracted includes a source of hydraulic fluid under pressure which can be a conventional open loop circuit but preferably is a hydrostatic system of the type illustrated in FIG. 9. The same form of control valve 72 is employed so that upon delivery of hydraulic fluid to the line 160 the actuator 110 is extended. This causes hydraulic fluid to be forced from the cylinder 110 through line 162 to the actuator 112 causing movement of the associated pulley 118 at the same time hydraulic fluid is returned from the cylinder of the hydraulic actuator 112 through the line 164 to the valve 72 and the hydrostatic circuit. During movement of the sheaves or pulleys 118 associated with the cylinders 110 and 112 or to the right as seen in FIG. 8, displacement of the cables guided by the pulleys 118 causes the carriage 14 to move longitudinally for the full length of the frame 12. Upon reaching the end of its stroke, at the right end of frame 12 in FIG. 8, the carriage 14 can be returned to the left and to the position illustrated by appropriate manipulation of the control valve 72 to deliver hydraulic fluid to the actuator 112 and exhaust hydraulic fluid through the line 160 from the actuator 110.

As with the prior embodiment of the invention, the frame 12 of the embodiment in FIGS. 6, 7, and 8 can be supported in any attitude.

A load moving apparatus has been provided which is suitable for moving heavy loads accurately and repetitivly at high speeds in which a channel-shaped member is provided with a pair of guide members which support a carriage member for the required reciprocating movement for all positions of the frame member varying between a vertical plane and a horizontal plane and in any position of rotation about an axis extending longitudinally of the frame.

The embodiments of the invention in which an exclusive property or privilege is claimed are defined as follows:

1. A load moving apparatus comprising: a channel shaped elongated frame having a predetermined straight length and having continuous parallel flange portions, attaching means on said frame for supporting said frame in any selected position between a vertical plane and a horizontal plane and in any position of rotation about an axis extending longitudinally of said frame, a carriage, a pair of guide members supported on said frame and extending longitudinally of said frame and at opposite sides thereof, said guide members having a substantially circular cross-section and being supported in spaced relationship to said flange portions and in parallel relationship to each other, sets of rolling elements supported in pairs on said carriage for rotation about parallel axes extending transversely to said flange portions and in rolling engagement with diametrically opposed sides of said guide members to confine and maintain said carriage relative to said guide members for all selected positions of said frame, motion transmitting means acting between said carriage and said frame independently of said rolling elements and guide members for repeated reciprocating movement of said carriage relative to said frame in all of said selected positions of said frame.

2. The load moving apparatus of claim 3 and further comprising a power take off means rotatable with said pinion and connected to a signal member for rotation of said signal member through one revolution during movement of said carriage member the full length of said frame member.

3. The load moving apparatus of claim 1 wherein said motion transmitting means includes a toothed rack extending longitudinally of said frame, a toothed pinion in engagement with said rack, and rotary motor means on said carriage drivingly connected to rotate said pinion and move said carriage longitudinally of said rack.

4. The load moving apparatus of claim 3 wherein said rotary motor means is a hydraulic motor, and a source of hydraulic pressure communicating with said motor means.

5. The load moving apparatus of claim 4 wherein said motor is supported on said carriage to move in said channel member longitudinally of said frame.

6. The load moving apparatus of claim 4 wherein said rotary hydraulic motor forms a part of a hydrostatic hydraulic system.

7. The load moving apparatus of claim 1 wherein said motion transmitting means includes a reciprocating hydraulic actuator acting between said carriage and said frame member.

8. The load moving apparatus of claim 7 wherein said motion transmitting means includes a pair of hydraulic actuators operable separately for movement of said carriage by one of said hydraulic actuators in one direction and movement of said carriage in the other direction by the other of said hydraulic members.

9. The load moving apparatus of claim 1 wherein said motion transmitting means includes a pair of hydraulic actuators connected to said carriage through means whereby said carriage is moved in one direction upon actuation of one of said hydraulic actuators and is moveable in the other direction upon actuation of the other of said hydraulic actuators.

10. The load moving apparatus of claim 9 wherein said hydraulic actuators are connected to said carriage through pulley and cable means.

11. The load moving apparatus of claim 10 wherein said cable and pulley means includes a pulley supported at the end of each rod of said hydraulic actuators, said pulleys each being supported for guided movement in a path parallel to the movement of said carriage.

12. The load moving apparatus of claim 11 wherein the guide means includes a grooved member engageable with spaced complementary guide members arranged in parallel relationship to each other and to the path of movement of said carriage.

13. The load moving apparatus of claim 12 wherein said cable and pulley means include a pair of flexible members, each of said flexible members having one end attached to said carriage and the other end attached to said frame, each of said flexible members being guided over a pulley moveable by said hydraulic actuators.

* * * * *